US012255377B2

(12) United States Patent
Takemoto et al.

(10) Patent No.: US 12,255,377 B2
(45) Date of Patent: Mar. 18, 2025

(54) WAVEGUIDE CONNECTION STRUCTURE, DETERMINATION METHOD THEREOF, MANUFACTURING METHOD THEREOF, AND WAVEGUIDE SWITCH USING SAME

(71) Applicant: ANRITSU CORPORATION, Kanagawa (JP)

(72) Inventors: Yusa Takemoto, Kanagawa (JP); Shigenori Mattori, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 303 days.

(21) Appl. No.: 18/055,993

(22) Filed: Nov. 16, 2022

(65) Prior Publication Data

US 2023/0187803 A1 Jun. 15, 2023

(51) Int. Cl.

| | |
|---|---|
| ***H01P 3/127*** | (2006.01) |
| ***H01P 1/04*** | (2006.01) |
| ***H01P 1/10*** | (2006.01) |
| ***H01P 3/12*** | (2006.01) |
| ***H01P 5/08*** | (2006.01) |
| ***H01P 11/00*** | (2006.01) |

(52) U.S. Cl.
CPC .............. *H01P 3/121* (2013.01); *H01P 1/042* (2013.01); *H01P 1/10* (2013.01); *H01P 5/082* (2013.01); *H01P 11/002* (2013.01)

(58) Field of Classification Search
CPC .. H01P 3/121; H01P 3/12; H01P 3/123; H01P 3/127; H01P 1/10; H01P 1/04; H01P 1/042; H01P 11/002; H01P 5/00; H01P 5/02; H01P 5/024; H01P 5/022; H01P 5/082
See application file for complete search history.

(56) References Cited

U.S. PATENT DOCUMENTS

2011/0187482 A1* 8/2011 Ohno ...................... H01P 5/107 333/254
2016/0172731 A1 6/2016 Kawamura et al.

FOREIGN PATENT DOCUMENTS

| | | |
|---|---|---|
| JP | 2007-336299 A | 12/2007 |
| JP | 2016-116015 A | 6/2016 |
| JP | 6185455 B2 | 8/2017 |

* cited by examiner

*Primary Examiner* — Stephen E. Jones
(74) *Attorney, Agent, or Firm* — McDonald Hopkins LLC

(57) ABSTRACT

Provided is a waveguide connection structure 1 in which two waveguides 10 and 20 respectively formed with waveguide paths 11 and 21 face each other, in which a choke groove 25 having a depth corresponding to a leakage prevention target frequency is provided, at the end face 20*a* of the waveguide 20, in a band-shaped region whose center is a center of the waveguide path 21, and which is bounded by an inner ellipse and an outer ellipse, the minor radius of the outer ellipse is longer than the minor radius of the inner ellipse by a length corresponding, and the choke groove 25 includes two groove portions 25*a* and 25*b* that are in contact with the inner ellipse and the outer ellipse and are located on the longer side of the rectangle, in the band-shaped region.

5 Claims, 15 Drawing Sheets

WAVEGUIDE CONNECTION STRUCTURE, DETERMINATION METHOD THEREOF, MANUFACTURING METHOD THEREOF, AND WAVEGUIDE SWITCH USING SAME

TECHNICAL FIELD

The present invention relates to a waveguide connection structure, a determination method thereof, a manufacturing method thereof, and a waveguide switch using the same.

BACKGROUND ART

In order to cope with mobile traffic, which is expected to further increase in the future, there is a strong demand for the use of millimeter wave and terahertz wave bands for wireless communication, which are capable of achieving transmission speeds on the order of several tens of Gbps, and for example, the use of 252 to 325 GHz is considered in IEEE802.15.3d.

For example, a rectangular waveguide with inner dimensions of 0.864 mm×0.432 mm is used as a propagation path for propagating electromagnetic waves in the WR-3 band (220 to 325 GHZ). As a choke flange for coupling such rectangular waveguides, a choke flange having a structure in which a rectangular choke groove is formed in order to prevent leakage of electromagnetic waves from the waveguide opening is known (for example, See Patent Document 1).

FIG. 13 shows a waveguide connection structure in the related art in which a waveguide 90 for the WR-3 band having rectangular choke grooves 92-1 to 92-3 formed around the opening of the waveguide path 91 on the flange surface is coupled with a waveguide 80 with a flat flange surface with a predetermined gap g.

FIG. 14 is an enlarged view of the triple choke grooves 92-1 to 92-3 shown in FIG. 13. The choke grooves 92-1 to 92-3 are rectangular frame-shaped continuous grooves each having a predetermined width and a predetermined depth, and are provided concentrically with respect to the center position of the opening of the waveguide path 91. The depth of each of the choke grooves 92-1 to 92-3 and a distance from the end of the opening of the waveguide path 91 to the inner side of the nearest choke groove 92-1 are each set to λg/4, where λg is the guide wavelength.

RELATED ART DOCUMENT

Patent Document

[Patent Document 1] Japanese Patent No. 6185455

DISCLOSURE OF THE INVENTION

Problem that the Invention is to Solve

FIG. 15A is a perspective view showing a waveguide connection structure in the related art in which two rectangular waveguides 80' and 90' without choke grooves formed therein face each other in parallel with a predetermined gap g. A waveguide path 81' is formed in the waveguide 80', and a waveguide path 91' is formed in the waveguide 90'. The waveguides 80' and 90' correspond to WR-3 waveguides having the WR-3 band as the transmission band.

FIG. 15B shows a simulation result of the in-plane electric field distribution when the operating frequency is 280 GHz and the gap g is 300 μm, in the structure of FIG. 15A. In FIG.

15B, a rectangle indicating the position of the waveguide path 91' and an ellipse and a circle indicating the position of the equiphase surface (wave front) of the electromagnetic wave are superimposed on the image of the simulation result.

According to the simulation result of FIG. 15B, the equiphase surface of the electromagnetic wave emitted from the waveguide path 91' and leaking into the void in the gap g is substantially circular (for example, wf1 in the figure) at a position away from the center of the waveguide path 91' by one wavelength or more, but has a shape close to an ellipse (for example, wf2 in the figure) at a position near the center of the waveguide path 91'. Further, it can be seen that the electric field of the electromagnetic wave leaking into the void in the gap g spreads like a fan, and is strongest in the direction perpendicular to the longer side of the opening of the rectangle of the waveguide path 91'.

However, in the choke flange in the related art as shown in FIGS. 13 and 14, the shapes of the choke grooves 92-1 to 92-3 do not correspond to the electric field that spreads like a fan, so that there is a problem that the leakage of electromagnetic waves cannot be suppressed within a practically allowable range due to the existence of such an unnecessary resonance mode, in the WR-3 band. The unnecessary resonance mode in this choke flange is such that the electromagnetic waves reflected by the straight choke grooves 92-1 to 92-3 interfere with each other between the waveguide path 91' and the choke grooves 92-1 to 92-3, without canceling out the waves incident on the choke grooves 92-1 to 92-3.

The present invention has been made in order to solve such problems in the related art, and an object of the present invention is to provide a waveguide connection structure, a determination method thereof, a manufacturing method thereof, and a waveguide switch using the same which are capable of effectively suppressing the leakage of electromagnetic waves from a connection point of two facing waveguides.

Means for Solving the Problem

In order to solve the above-described problems, a waveguide connection structure according to the present invention is a waveguide connection structure including two waveguides having end faces each of which is formed with at least one waveguide path, the end faces face each other in parallel with a predetermined gap, in which a choke groove having a depth corresponding to ¼ of a guide wavelength corresponding to a leakage prevention target frequency is provided at the end face of at least one of the two waveguides, in a band-shaped region surrounding an opening of a rectangle of the at least one waveguide path, the band-shaped region is a region whose center is a center of the rectangle, and which is bounded by an inner ellipse and an outer ellipse whose major axis direction is parallel to a longer side of the rectangle, a minor radius of the inner ellipse corresponds to ¼ of the guide wavelength, a minor radius of the outer ellipse is longer than the minor radius of the inner ellipse by a length corresponding to ¼ of the guide wavelength, and the choke groove includes two groove portions that are in contact with the inner ellipse and the outer ellipse and are located on the longer side of the rectangle, in the band-shaped region.

In other words, the waveguide connection structure according to the present invention is a structure in which a choke groove of a shape that covers a region having a strong electric field of an electromagnetic wave leaking into a predetermined gap between two waveguides is formed on the end face of at least one of the two waveguides. With this configuration, the waveguide connection structure according to the present embodiment can effectively suppress the leakage of electromagnetic waves from a connection point of two facing waveguides.

Further, in the connection structure according to the present invention, the choke groove further includes two groove portions that are in contact with the inner ellipse and the outer ellipse and are located on the shorter side of the rectangle, in the band-shaped region, and the four groove portions may be separated from each other by four non-groove portions along the diagonal direction of the rectangle within the band-shaped region.

With this configuration, the waveguide connection structure according to the present invention can suppress the leakage of electromagnetic waves to less than-25 dB, over the entire operating frequency range of a WR-3 waveguide (fractional bandwidth of about 40%), for example, with respect to a predetermined gap up to about 1/10 wavelength of the guide wavelength.

Further, a determination method of a waveguide connection structure according to the present invention is a determination method of a waveguide connection structure in which end faces of two waveguides respectively formed with at least one waveguide path face each other in parallel with a predetermined gap, a choke groove having a depth corresponding to 1/4 of a guide wavelength corresponding to a leakage prevention target frequency is provided at the end face of at least one of the two waveguides, in a band-shaped region surrounding an opening of a rectangle of the at least one waveguide path, the band-shaped region is a region whose center is a center of the rectangle, and which is bounded by an inner ellipse and an outer ellipse whose major axis direction is parallel to a longer side of the rectangle, a minor radius of the inner ellipse corresponds to 1/4 of the guide wavelength, a minor radius of the outer ellipse is longer than the minor radius of the inner ellipse by a length corresponding to 1/4 of the guide wavelength, and the choke groove includes two groove portions that are in contact with the inner ellipse and the outer ellipse and are located on the longer side of the rectangle, in the band-shaped region, the determination method including: an electromagnetic field analysis step of, by using, as an analysis model, an analysis waveguide connection structure in which end faces of two analysis waveguides, which respectively have waveguide paths of the same shape as the waveguide paths and are not formed with choke grooves, face each other in parallel with a predetermined gap, when an electromagnetic wave of the leakage prevention target frequency propagates from one to the other of the two analysis waveguides which are not formed with the choke grooves, acquiring a shape of an equiphase surface of electromagnetic waves leaking from the predetermined gap by electromagnetic field analysis; an ellipse shape acquisition step of acquiring a minor radius and a major radius of an equiphase surface separated by a distance corresponding to 1/4 of the guide wavelength in a direction perpendicular to the longer side of the rectangle from the center of the rectangle, among the equiphase surfaces acquired in the electromagnetic field analysis step; an inner ellipse shape determination step of determining the minor radius and the major radius of the equiphase surface acquired in the ellipse shape acquisition step as the minor radius and a major radius of the inner ellipse; and an outer ellipse shape determination step of determining values obtained by respectively adding a distance corresponding to 1/4 of the guide wavelength to the minor radius and the major radius of the inner ellipse determined in the inner ellipse shape determination step as the minor radius and a major radius of the outer ellipse.

With this configuration, in the determination method of a waveguide connection structure according to the present invention, the shape of the equiphase surface of the electromagnetic waves of the leakage prevention target frequency propagating from one to the other of the two analysis waveguides is acquired by electromagnetic field analysis, so that it is possible to determine the range of the band-shaped region R on the end face of at least one of the two waveguides.

Further, a manufacturing waveguide connection structure according to the present invention is a manufacturing method of a waveguide connection structure in which end faces of two waveguides respectively formed with at least one waveguide path face each other in parallel with a predetermined gap, a choke groove having a depth corresponding to 1/4 of a guide wavelength corresponding to a leakage prevention target frequency is provided at the end face of at least one of the two waveguides, in a band-shaped region surrounding an opening of a rectangle of the at least one waveguide path, the band-shaped region is a region whose center is a center of the rectangle, and which is bounded by an inner ellipse and an outer ellipse whose major axis direction is parallel to a longer side of the rectangle, a minor radius of the inner ellipse corresponds to 1/4 of the guide wavelength, a minor radius of the outer ellipse is longer than the minor radius of the inner ellipse by a length corresponding to 1/4 of the guide wavelength, and the choke groove includes two groove portions that are in contact with the inner ellipse and the outer ellipse and are located on the longer side of the rectangle, in the band-shaped region, the manufacturing method including: an electromagnetic field analysis step of, by using, as an analysis model, an analysis waveguide connection structure in which end faces of two analysis waveguides, which respectively have waveguide paths of the same shape as the waveguide paths and are not formed with choke grooves, face each other in parallel with a predetermined gap, when an electromagnetic wave of the leakage prevention target frequency propagates from one to the other of the two analysis waveguides which are not formed with the choke grooves, acquiring a shape of an equiphase surface of electromagnetic waves leaking from the predetermined gap by electromagnetic field analysis; an ellipse shape acquisition step of acquiring a minor radius and a major radius of an equiphase surface separated by a distance corresponding to 1/4 of the guide wavelength in a direction perpendicular to the longer side of the rectangle from the center of the rectangle, among the equiphase surfaces acquired in the electromagnetic field analysis step; an inner ellipse shape determination step of determining the minor radius and the major radius of the equiphase surface acquired in the ellipse shape acquisition step as the minor radius and a major radius of the inner ellipse; an outer ellipse shape determination step of determining values obtained by respectively adding a distance corresponding to 1/4 of the guide wavelength to the minor radius and the major radius of the inner ellipse determined in the inner ellipse shape determination step as the minor radius and a major radius of the outer ellipse; a choke groove formation step of forming the choke groove in the band-shaped region defined by the minor radii and the major radii of the inner ellipse and the outer ellipse determined in the inner ellipse shape determination step and the outer ellipse shape determination step; and a waveguide arrangement step of arranging the two waveguides such that the end faces of the two waveguides face each other in parallel with the predetermined gap.

That is, in the manufacturing method of the waveguide connection structure according to the present embodiment, the choke groove is formed in the band-shaped region of the end face of at least one of the two waveguides determined by the above determination method, and the two waveguides are disposed such that the end faces of the two waveguides face each other in parallel with the predetermined gap therebetween. With this configuration, the manufacturing method of a waveguide connection structure according to the present embodiment can manufacture the waveguide connection structure capable of effectively suppressing the leakage of electromagnetic waves from a connection point of two facing waveguides.

Further, a waveguide switch according to the present invention includes a base portion; a first fixed waveguide block which is fixed to the base portion, and in which at least one waveguide path surrounded by a metal wall is formed so as to penetrate from a first end face to a second end face; a second fixed waveguide block which is fixed to the base portion and has a third end face parallel to the second end face of the first fixed waveguide block, and in which at least one waveguide path surrounded by a metal wall is formed so as to penetrate from the third end face to a fourth end face; a movable waveguide block which has a fifth end face facing the second end face of the first fixed waveguide block with a predetermined gap in parallel and a sixth end face facing the third end face of the second fixed waveguide block with a predetermined gap in parallel, in which a plurality of waveguide paths surrounded by metal walls are formed penetrating from the fifth end face to the sixth end face, and which is supported by the base portion so as to be slidable parallel to the second end face of the first fixed waveguide block and the third end face of the second fixed waveguide block; and a driving device that is provided on the base portion and slides the movable waveguide block, in which the movable waveguide block is slid with respect to the first fixed waveguide block and the second fixed waveguide block, and any one of the plurality of waveguide paths of the movable waveguide block is selectively connected to between any one of the at least one waveguide path of the first fixed waveguide block and any one of the at least one waveguide path of the second fixed waveguide block, in different plurality of positions, a choke groove having a depth corresponding to ¼ of a guide wavelength corresponding to a leakage prevention target frequency is provided, in a band-shaped region surrounding at least one opening among an opening of the at least one waveguide path on a second end face side of the first fixed waveguide block, an opening of the at least one waveguide path on a third end face side of the second fixed waveguide block, and openings of the plurality of waveguide paths on a fifth end face side and a sixth end face side of the movable waveguide block, and the band-shaped region is a region whose center is a center of a rectangle, and which is bounded by an inner ellipse and an outer ellipse whose major axis direction is parallel to a longer side of the rectangle, a minor radius of the inner ellipse corresponds to ¼ of the guide wavelength, a minor radius of the outer ellipse is longer than the minor radius of the inner ellipse by a length corresponding to ¼ of the guide wavelength, and the choke groove includes two groove portions that are in contact with the inner ellipse and the outer ellipse and are located on the longer side of the rectangle, in the band-shaped region.

With this configuration, the waveguide switch according to the present invention uses the above-described waveguide connection structure for the movable portion (movable waveguide block), thereby improving the return loss and insertion loss of the switch over a wide band, and can suppress the unintended leakage of electromagnetic waves in the gap between the first fixed waveguide block and the movable waveguide block and the gap between the second fixed waveguide block and the movable waveguide block.

Further, the waveguide switch according to the present invention uses the above-described waveguide connection structure for the movable waveguide block, so that the gap between the first fixed waveguide block and the movable waveguide block and the gap between the second fixed waveguide block and the movable waveguide block can be made wider than before, and the machining accuracy is relaxed and the resistance to aging is improved.

Advantage of the Invention

The present invention provides a waveguide connection structure, a determination method thereof, a manufacturing method thereof, and a waveguide switch using the same which are capable of effectively suppressing the leakage of electromagnetic waves from a connection point of two facing waveguides.

BRIEF DESCRIPTION OF THE DRAWINGS

FIGS. 3A to 3C are diagrams showing an arrangement example of groove portions of a choke groove formed in the band-shaped region, in which FIG. 3A shows an example in which the choke groove includes two groove portions, FIG. 3B shows an example in which the choke groove includes four groove portions, and FIG. 3C shows an example in which the choke groove is formed over the entire band-shaped region.

FIG. 6A shows return loss, and FIG. 6B shows insertion loss.

BEST MODE FOR CARRYING OUT THE INVENTION

Embodiments of a waveguide connection structure, a determination method thereof, a manufacturing method thereof, and a waveguide switch using the same according to the present invention will be described below with reference to the drawings.

Figure 1:
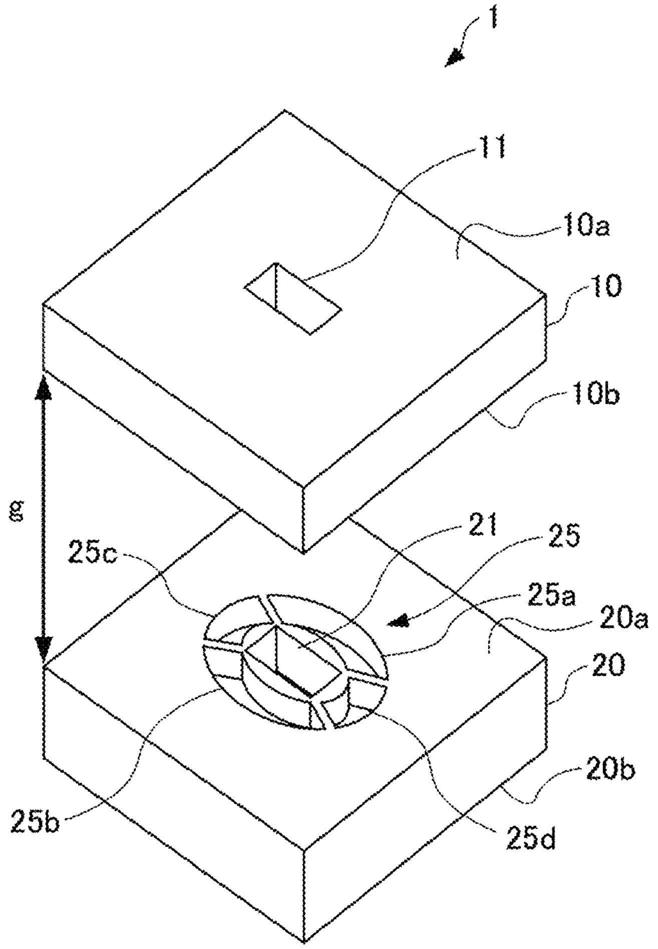
FIG. 1 is a perspective view showing a waveguide connection structure according to an embodiment of the present invention.

As shown in FIG. 1, the waveguide connection structure 1 of the present embodiment has a structure in which end faces 10*b* and 20*a* of two waveguides 10 and 20 face each other in parallel with a predetermined gap g. A waveguide path 11 is formed in the waveguide 10, and a waveguide path 21 is formed in the waveguide 20. For example, the waveguides 10 and 20 have inner dimensions of 0.864 mm×0.432 mm, and correspond to WR-3 waveguides having the transmission band of the WR-3 band (220 to 325 GHZ). A plurality of waveguide paths may be formed in the waveguides 10 and 20, like the first fixed waveguide block 40 and the movable waveguide block 60 which will be described later.

Figure 2:
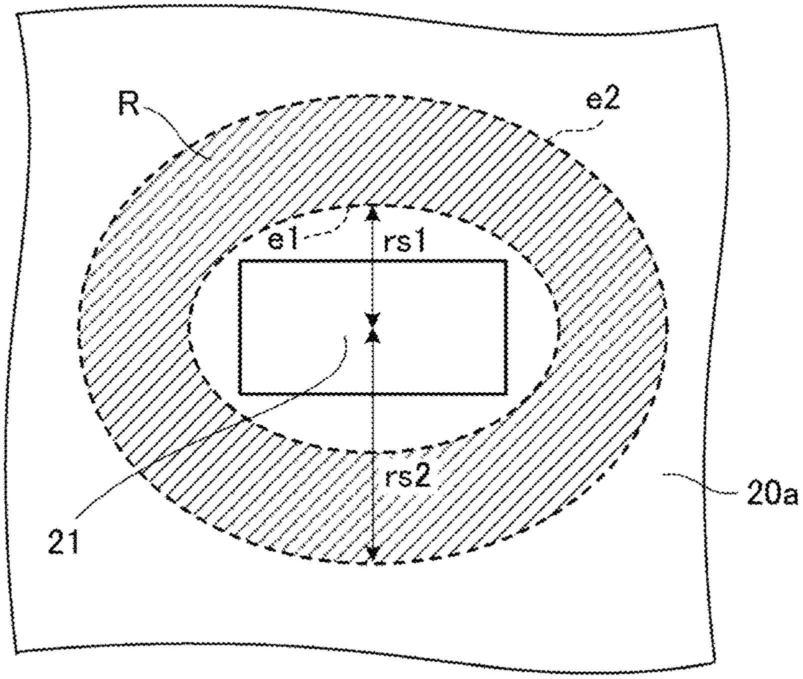
FIG. 2 is a diagram for explaining a band-shaped region in the waveguide connection structure according to the embodiment of the present invention.

In either one or both of the end face 10*b* of the waveguide 10 and the end face 20*a* of the waveguide 20, in the band-shaped region R surrounding the opening of the rectangle of the waveguide path 21, a choke groove 25 is provided to prevent leakage of electromagnetic waves from the gap g between the end faces 10*b* and 20*a*. The choke groove 25 provided in the end face 20*a* of the waveguide 20 will be mainly described later. The band-shaped region R is a region bounded by an inner ellipse e1 and an outer ellipse e2 whose major axis direction is parallel to the longer side of the opening of the rectangle of the waveguide path 21, as indicated by oblique lines in FIG. 2. The centers of the inner ellipse e1 and the outer ellipse e2 are equal to the center of the opening of the rectangle of the waveguide path 21.

The inner wall surfaces of the groove portions 25*a* to 25*d* forming the choke groove 25 are perpendicular to the end face 20*a*. Further, the depth of the groove portions 25*a* to 25*d* corresponds to ¼ of the guide wavelength λg corresponding to the leakage prevention target frequency. In the present embodiment, the leakage prevention target frequency is 272.5 GHZ, which is the center frequency of the WR-3 band (220 to 325 GHZ). In this case, the guide wavelength λg is approximately 1.43 mm. Here, the depth corresponding to ¼ of the guide wavelength λg refers to a depth within a range of ±20% of ¼ of the guide wavelength λg. In addition, the leakage prevention target frequency is not limited to the above values, and may be any frequency within the WR-3 band or other desired frequency band according to the sizes of the waveguide 10 and the waveguide 20.

The minor radius rs1 of the inner ellipse e1 has a length corresponding to ¼ of the guide wavelength λg. The minor radius rs2 of the outer ellipse e2 is longer than the minor radius rs1 of the inner ellipse e1 by a length corresponding to ¼ of the guide wavelength λg. Here, the length corresponding to ¼ of the guide wavelength λg refers to a length within a range of ±20% of ¼ of the guide wavelength λg.

Figure 3A:
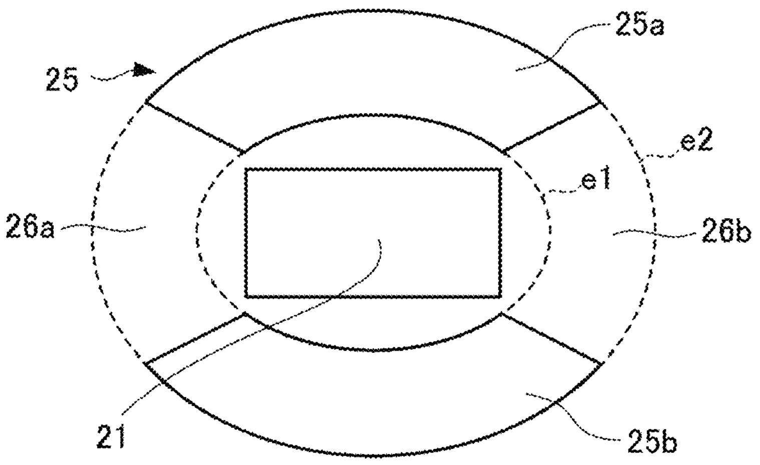
Figure 3B:
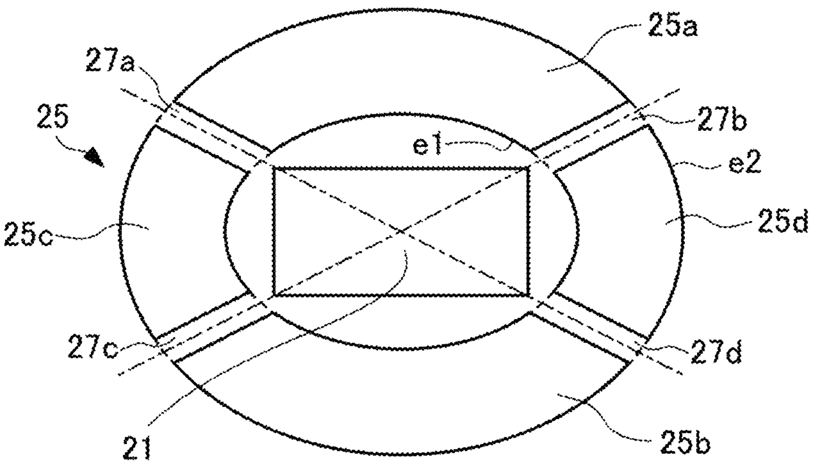
Figure 3C:
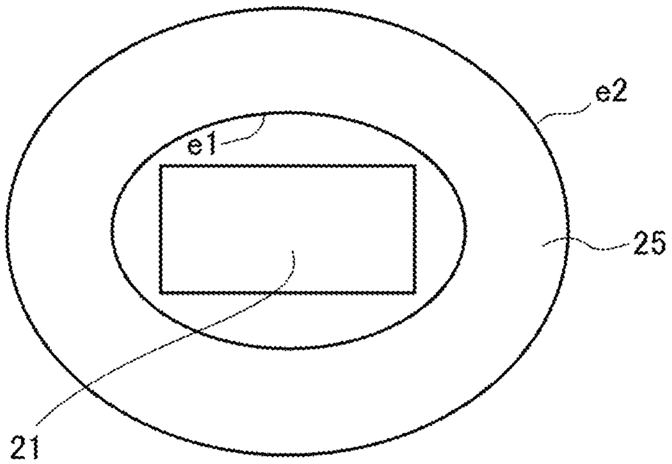

FIGS. 3A to 3C are diagrams showing an arrangement example of the choke grooves 25 formed in the band-shaped region R. In terms of geometrical optics, when a curved mirror along the equiphase surface of an electromagnetic wave is placed on the propagation path of the electromagnetic wave, the reflected wave of the electromagnetic wave reflected by the curved mirror traces the traveling direction of the incident wave of the electromagnetic wave incident on the curved mirror in the opposite direction. Therefore, when an elliptical curved mirror (choke groove 25) along the equiphase surface of the radiation wave that leaks from the waveguide path 21 into the void and does not directly enter the waveguide path 11 is formed at a position where the phase shift is π/2 (¼ wavelength) from the center of the opening of the waveguide path 21, the reflected wave of the radiation wave at the choke groove 25 becomes opposite in phase to the incident wave of the radiation wave and the waves cancel out each other. In other words, it is estimated that the choke groove 25 can suppress unnecessary radiation waves.

Figure 15A:
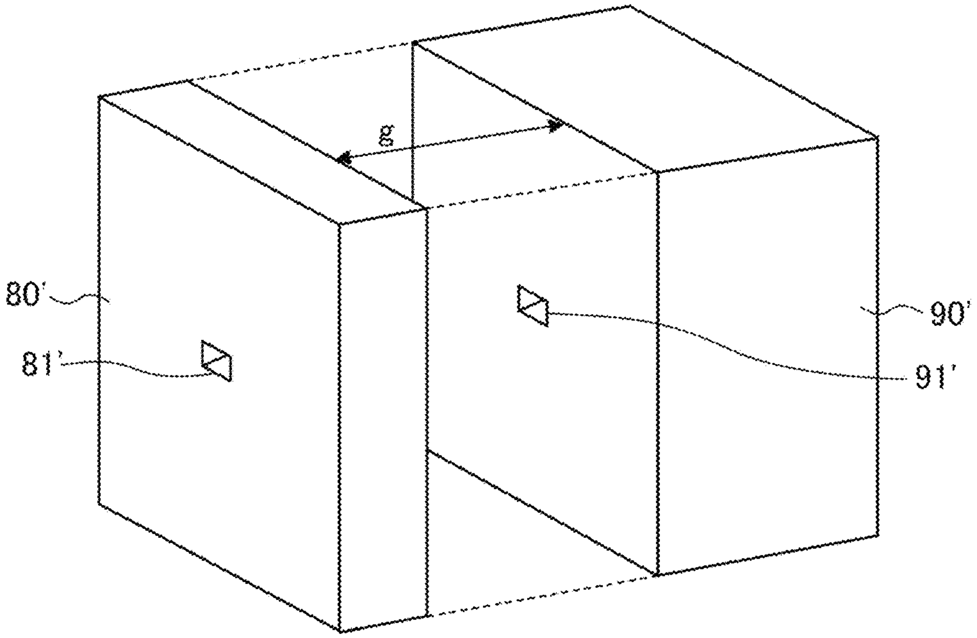
FIG. 15A is a perspective view showing another example of the waveguide connection structure in the related art.
Figure 15B:
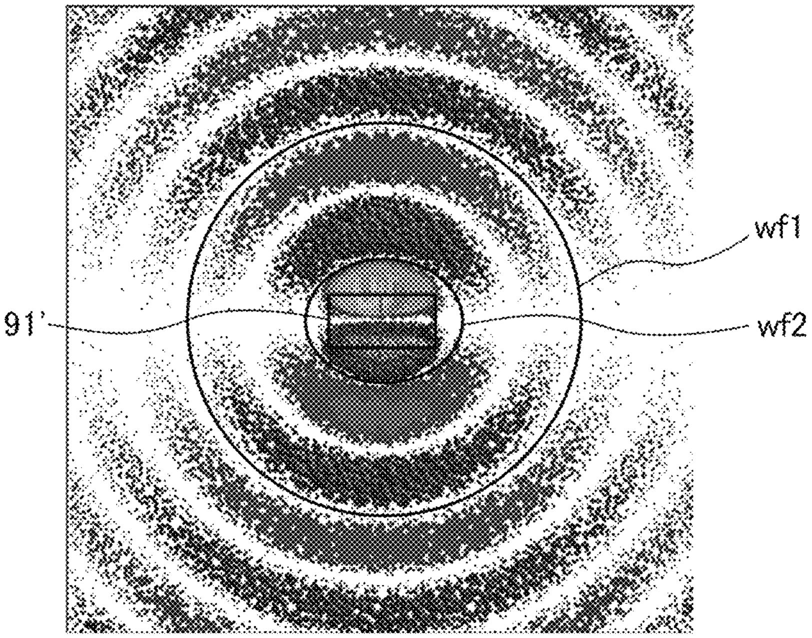
FIG. 15B is a graph showing a simulation result of the in-plane electric field distribution in the gap of the waveguide connection structure of FIG. 15A.

FIG. 3A shows an example in which the choke groove 25 includes two groove portions 25*a* and 25*b*. The two groove portions 25*a* and 25*b* are in contact with the inner ellipse e1 and the outer ellipse e2 in the band-shaped region R, and are located on the longer side of the opening of the rectangle of the waveguide path 21. These two groove portions 25*a* and 25*b* are separated from each other in the band-shaped region R by two non-groove portions 26*a* and 26*b* located on the shorter sides of the opening of the rectangle of the waveguide path 21. That is, the choke groove 25 shown in FIG. 3A has a shape that covers the region having a strong electric field that spreads like a fan, as shown in the simulation result of FIG. 15B. Compared with the structures shown in FIGS. 3B and 3C, the structure shown in FIG. 3A requires less area for the choke groove 25, so that the manufacturing cost and the number of man-hours can be reduced.

FIG. 3B shows an example in which the choke groove 25 includes four groove portions 25*a*, 25*b*, 25*c*, and 25*d*. This is equivalent to the configuration of choke groove 25 shown in FIG. 1. Similar to that shown in FIG. 3A, the two groove portions 25*a* and 25*b* are in contact with the inner ellipse e1 and the outer ellipse e2 in the band-shaped region R, and are located on the longer sides of the opening of the rectangle of the waveguide path 21. Further, the two groove portions 25*c* and 25*d* are in contact with the inner ellipse e1 and the outer ellipse e2 in the band-shaped region R, and are located on the shorter side of the opening of the rectangle of the waveguide path 21. These four groove portions 25*a* to 25*d* are separated from each other in the band-shaped region R by four non-groove portions 27*a*, 27*b*, 27*c*, and 27*d* along the diagonal direction of the opening of the rectangle of the waveguide path 21.

FIG. 3C shows an example in which the choke groove 25 is formed in the entire band-shaped region R. In the configuration in which the choke groove 25 is formed in the entire band-shaped region R, compared with the configuration of FIG. 3A or 3B in which the choke groove 25 is formed only in a part of the band-shaped region R, better frequency characteristics (return loss $S_{11}$ and insertion loss $S_{21}$) can be obtained in a narrower frequency range.

Figure 4:
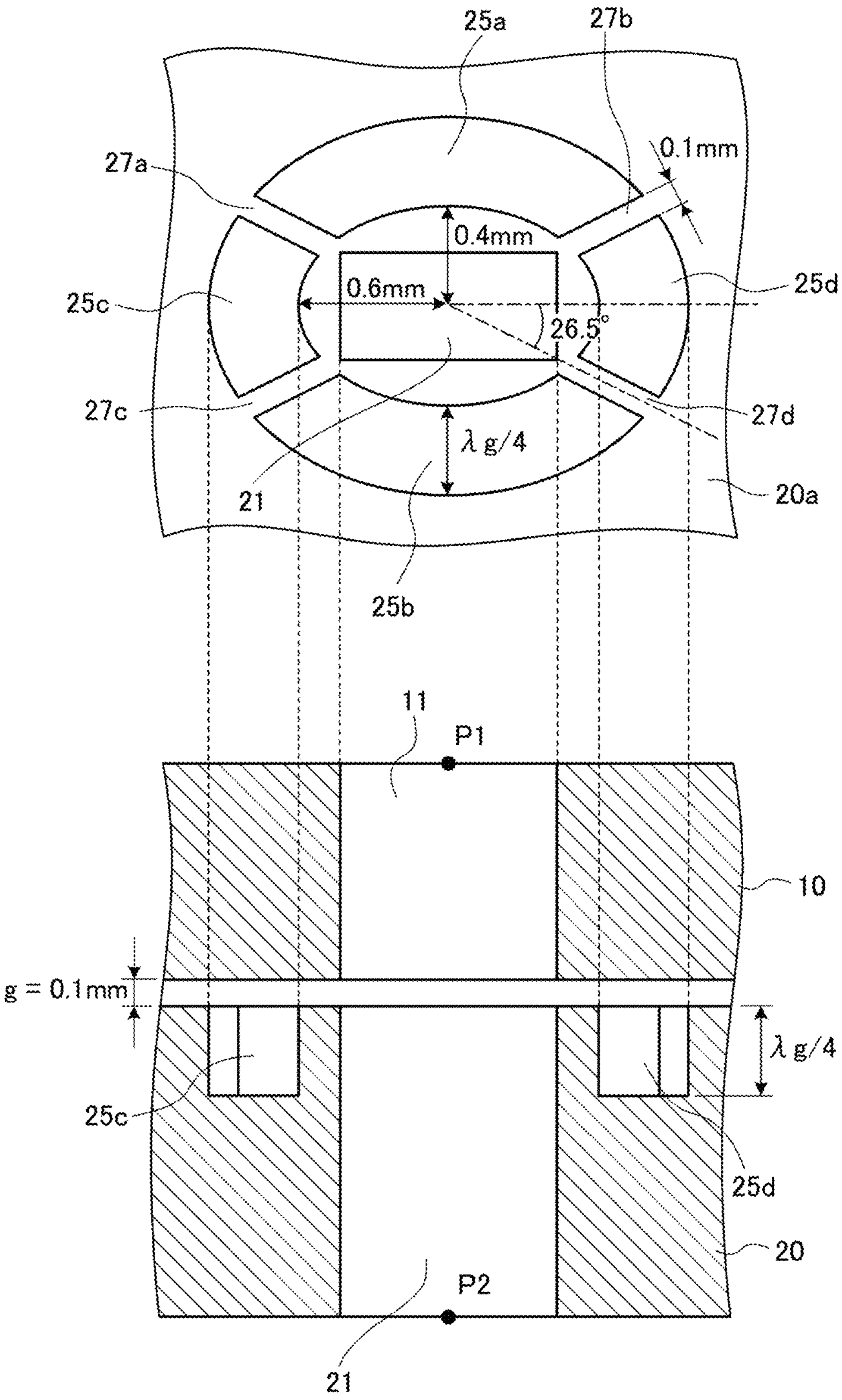
FIG. 4 is a view showing an example of dimensions of the choke groove in FIG. 3B and a cross section including the center of an opening of a waveguide path of the waveguide connection structure.

The upper part of FIG. 4 shows an example of the dimensions of the choke groove 25 shown in FIG. 3B. The lower part of FIG. 4 shows a cross section including the centers of the openings of the waveguide paths 11 and 21 of the waveguide connection structure 1.

The minor radius rs1 of the inner ellipse e1 is 0.4 mm, and is a distance corresponding to ¼ of the guide wavelength λg of the WR-3 band. The major radius of the inner ellipse e1 is 0.6 mm. The minor radius rs2 of the outer ellipse e2 is 0.76 (=0.4+λg/4) mm. The major radius of the outer ellipse e2 is 0.96 (=0.6+λg/4) mm. The angles formed by the extending directions of the four non-groove portions 27*a*, 27*b*, 27*c*, and 27*d* with respect to the major radii of the inner ellipse e1 and the outer ellipse e2 are all 26.5°. The width of the four non-groove portions 27*a*, 27*b*, 27*c*, and 27*d* is 0.1 mm. Each of the four groove portions 25*a* to 25*d* has a depth of 0.36 (=λg/4) mm. A gap g between the end faces 10*b* and 20*a* is 0.1 mm.

Figure 5A:
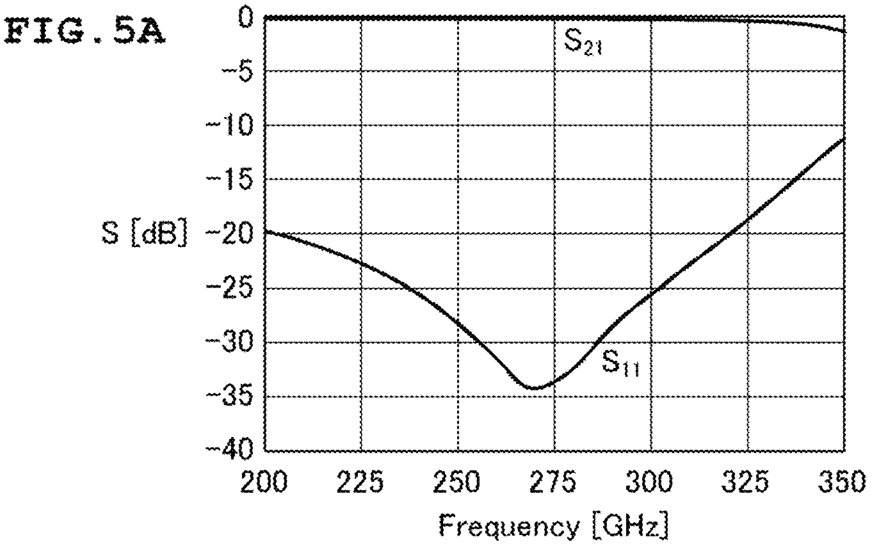
FIG. 5A is a graph showing a simulation result of return loss and insertion loss of the waveguide connection structure.
Figure 5B:
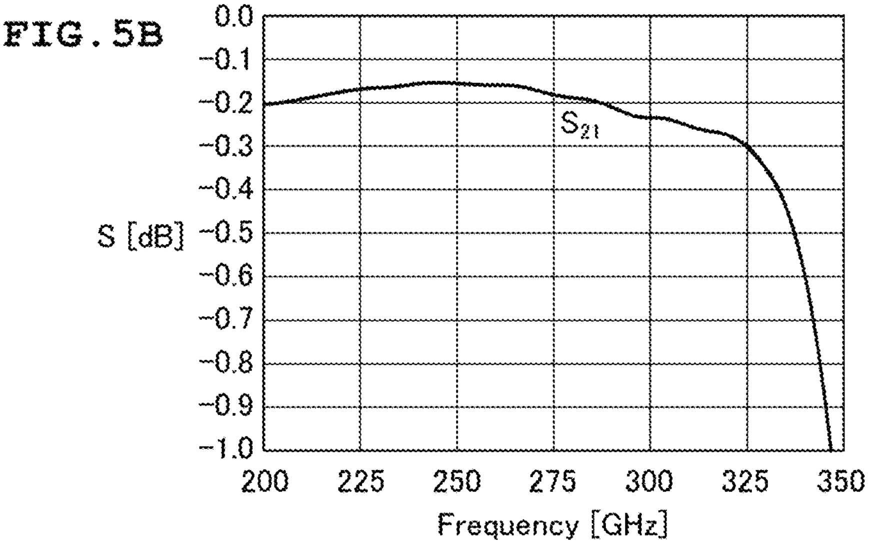
FIG. 5B is an enlarged graph near 0 dB in FIG. 5A.

FIGS. 5A and 5B show simulation results of the return loss $S_{11}$ and the insertion loss $S_{21}$ between the waveguide paths 11 and 21 in the structure of FIG. 4. FIG. 5B is an enlarging graph of the vicinity of 0 dB in FIG. 5A. In this simulation, it is assumed that an electromagnetic wave is incident from the waveguide 10 on the port P1 side shown in FIG. 4B toward the waveguide 20 on the port P2 side.

Figure 5C:
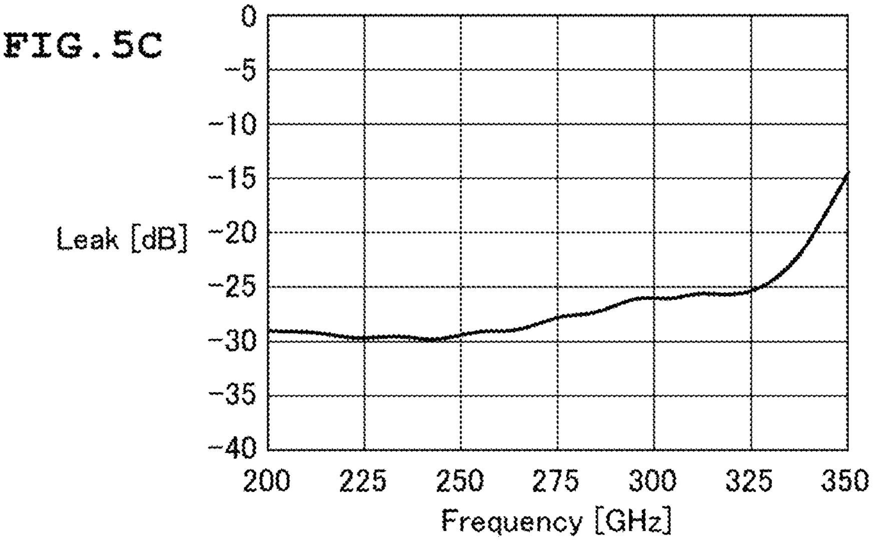
FIG. 5C shows the leakage of electromagnetic waves from the gap in the waveguide connection structure.

As shown in FIG. 5A, the frequency range in which the return loss $S_{11}$ is less than −15 dB is 200.0 to 336.4 GHZ, and it is confirmed that the return loss $S_{11}$ is suppressed to less than −15 dB over a wide frequency range including the WR-3 band (220 to 325 GHz, fractional bandwidth of about 40%). Further, as shown in FIG. 5B, it is confirmed that the insertion loss $S_{21}$ shows a good value (close to 0 dB) higher than −0.5 dB over the WR-3 band. Further, as shown in FIG. 5C, it is confirmed that the leakage of electromagnetic waves from between the waveguide paths 11 and 21 in the structure of FIG. 4 is suppressed to less than −25 dB over the WR-3 band.

Even when the port P1 side is the waveguide 20 and the port P2 side is the waveguide 10, the return loss $S_{11}$ and the insertion loss $S_{21}$ between the waveguide paths 11 and 21 do not change.

In the above simulation, the gap g between the end faces 10*b* and 20*a* is assumed to be 0.1 mm, but it has been confirmed that the return loss $S_{11}$ in the frequency range including the WR-3 band can be suppressed to less than-15 dB, even with a gap g of 0.15 mm, which corresponds to about 1/10 wavelength of the guide wavelength λg (=1.43 mm) at 272.5 GHZ, which is the center frequency of the WR-3 band.

Figure 6A:
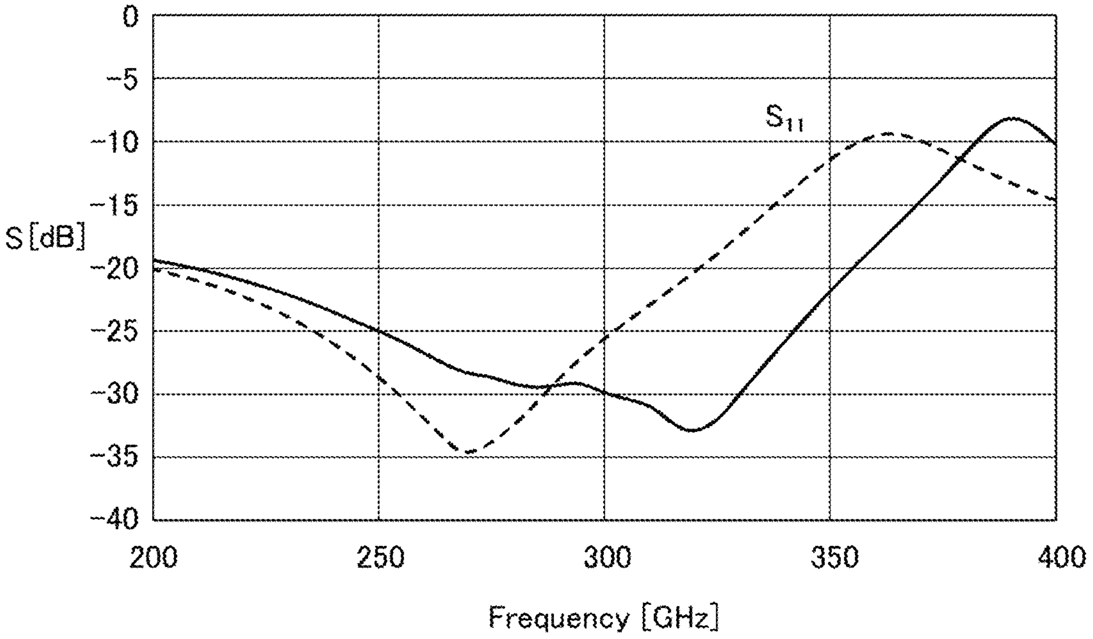
FIGS. 6A and 6B are graphs showing a simulation result of return loss and insertion loss of a structure in which choke grooves are provided on facing end faces of the waveguide connection structure, where
Figure 6B:
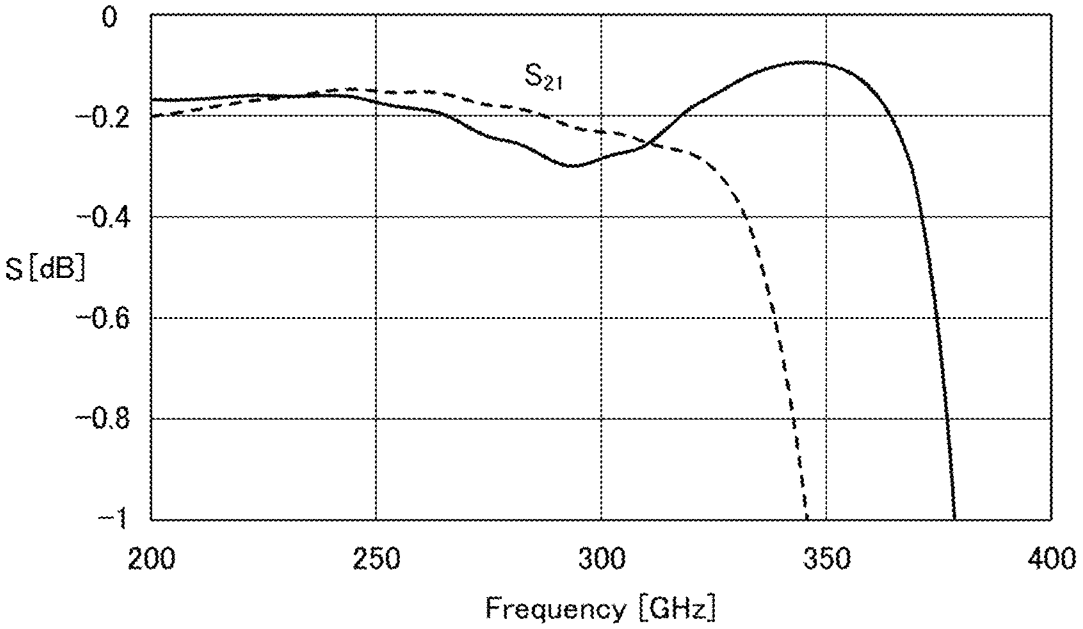

FIGS. 6A and 6B show simulation results of the return loss $S_{11}$ and the insertion loss $S_{21}$ between the waveguide paths 11 and 21, in a structure in which similar choke grooves are provided not only on the end face 20*a* of the waveguide 20 but also on the end face 10*b* of the waveguide 10. For comparison, FIGS. 6A and 6B show the return loss $S_{11}$ and the insertion loss $S_{21}$ in a structure in which the choke groove 25 is provided only on the end face 20*a* of the waveguide 20, with broken lines.

Compared to the configuration in which the choke groove is provided only on the end face 20*a* of the waveguide 20, in the configuration in which the choke grooves are provided both on the end face 10*b* of the waveguide 10 and the end face 20*a* of the waveguide 20, it is confirmed that in a wider frequency range, the return loss $S_{11}$ can be suppressed to less than −15 dB, and the insertion loss $S_{21}$ exhibits good values higher than −0.5 dB.

Figure 7:
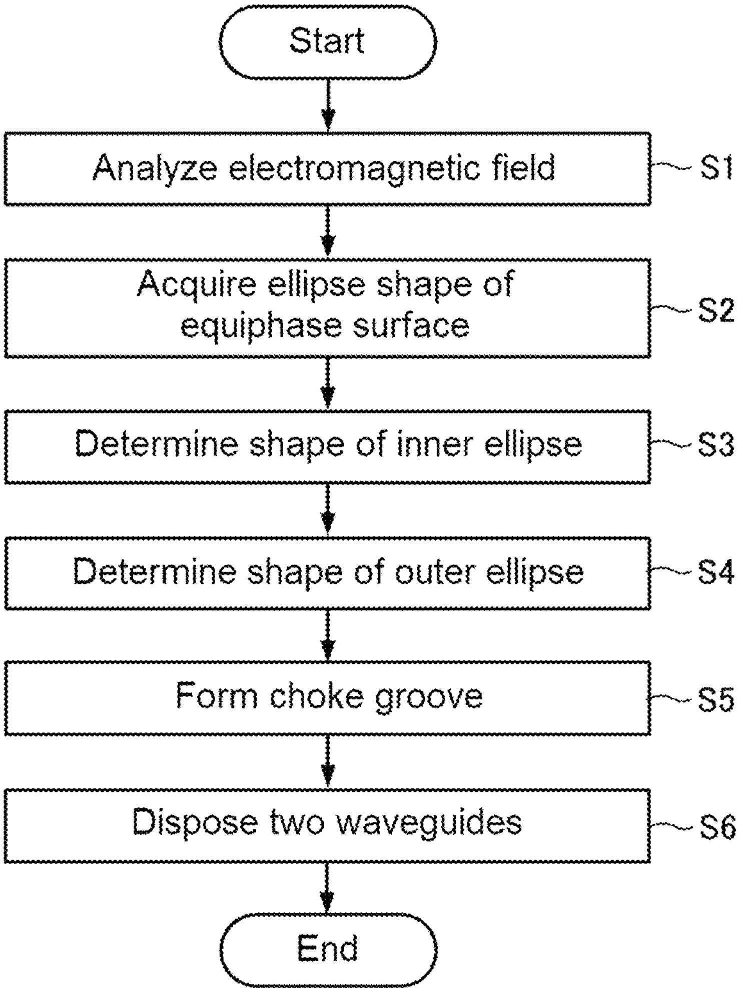
FIG. 7 is a flow chart showing an example of a determination method and a manufacturing method of the waveguide connection structure.

Hereinafter, an example of a determination method of a waveguide connection structure (steps S1 to S4 below) and a manufacturing method (steps S1 to S6 below) will be described with reference to FIG. 7. The determination method of the present embodiment is executed by a control device such as a microcomputer or a personal computer including a CPU, a ROM, a RAM, a HDD, and the like.

First, by using, as an analysis model, an analysis waveguide connection structure in which the end faces of two analysis waveguides, which respectively have waveguide paths of the same shape as the waveguide paths 11 and 21 of the two waveguides 10 and 20 and are not formed with choke grooves, face each other in parallel with a predetermined gap g, when an electromagnetic wave of a leakage prevention target frequency propagates from one to the other of the two analysis waveguides which are not formed with the choke grooves, the shapes of equiphase surfaces of the electromagnetic wave leaking from the predetermined gap g are acquired by electromagnetic field analysis (electromagnetic field analysis step S1). For example, the two analysis waveguides correspond to waveguides 80' and 90' shown in FIG. 15A. In the following description, the waveguide 90' is the waveguide 20 before the choke groove is formed, and the waveguide path 91' has the same shape as the waveguide path 21.

Next, the minor radius and the major radius of an equiphase surface separated by a distance corresponding to ¼ of the guide wavelength λg in the direction perpendicular to the longer side of the rectangle from the center of the opening of the rectangle of the waveguide path 91' of the waveguide 90', among the equiphase surfaces acquired in the electromagnetic field analysis step S1 are acquired (ellipse shape acquisition step S2).

Next, the minor radius and the major radius of the equiphase surface acquired in the ellipse shape acquisition step S2 are determined as the minor radius and the major radius of the inner ellipse e1 (inner ellipse shape determination step S3).

Next, values obtained by respectively adding a distance corresponding to ¼ of the guide wavelength λg to the minor radius and the major radius of the inner ellipse e1 determined in the inner ellipse shape determination step S3 are determined as the minor radius and the major radius of the outer ellipse e2 (outer ellipse shape determination step S4).

Next, the waveguide 20 is completed by forming the choke groove 25 in the band-shaped region R of the waveguide 90' defined by the minor radii and the major radii of the inner ellipse e1 and the outer ellipse e2 determined in the inner ellipse shape determination step S3 and the outer ellipse shape determination step S4 (choke groove formation step S5).

Next, the two waveguides 10 and 20 are arranged such that the end face 10*b* of the waveguide 10 and the end face 20*a* of the waveguide 20 face each other in parallel with a predetermined gap g (waveguide arrangement step S6). This completes the waveguide connection structure.

The configuration of a waveguide switch 100 including the waveguide connection structure 1 according to the embodiment of the present invention will be described below. In general, a gap is required around a moving unit such as a waveguide switch, but there is a lower limit to the size of the allowable gap due to restrictions on machining accuracy. Further, the gap may be widened due to abrasion of the sliding unit of the mechanism that supports the moving unit. As the operating frequency (the shorter the wavelength) increases, the gap of the same size becomes substantially wider with respect to the wavelength, so that leakage of electromagnetic waves increases. The waveguide switch 100 of the present embodiment suppresses leakage of electromagnetic waves in such gaps around the moving unit.

Figure 8:
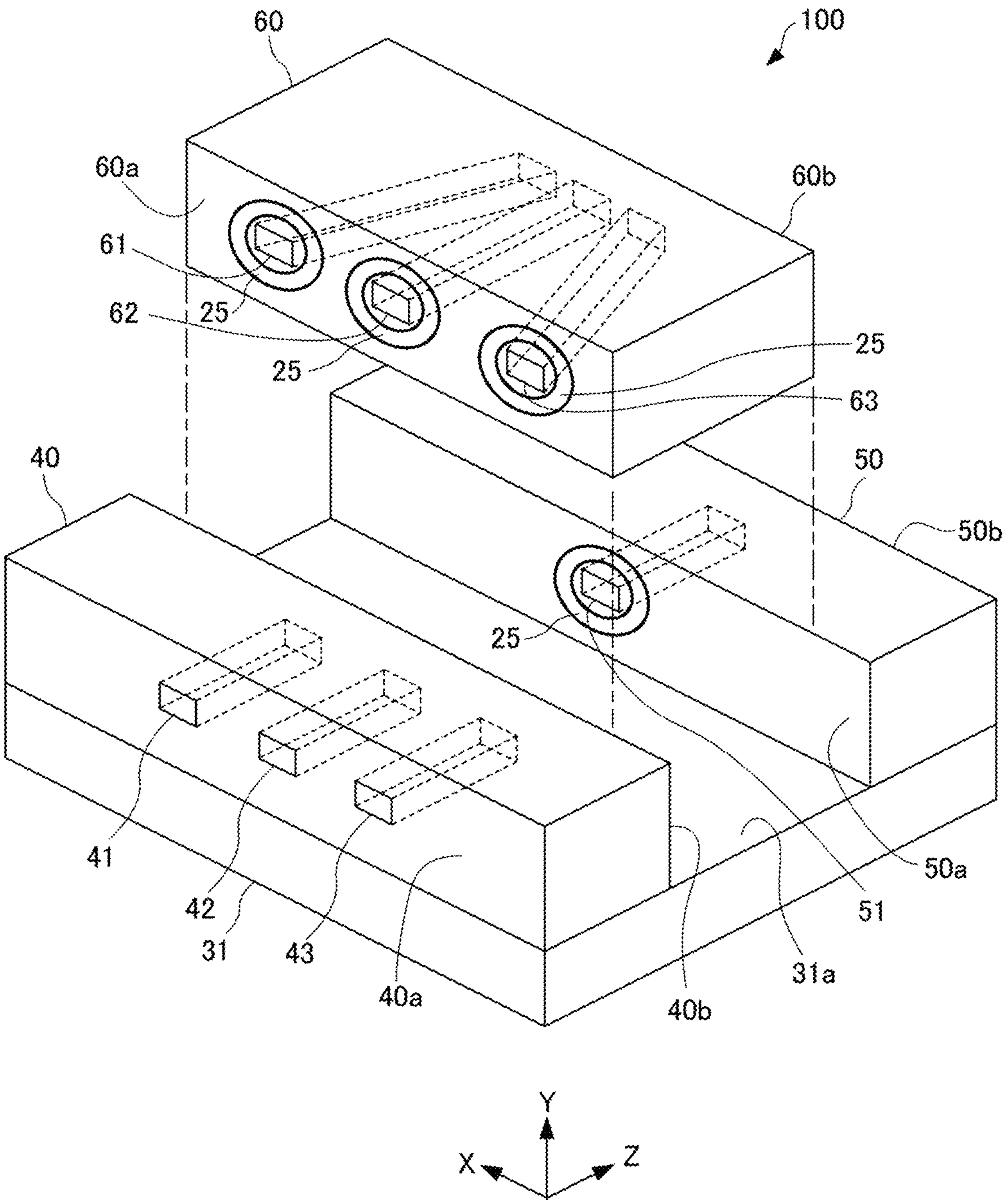
FIG. 8 is an exploded perspective view of a waveguide switch having the waveguide connection structure according to the embodiment of the present invention.
Figure 9:
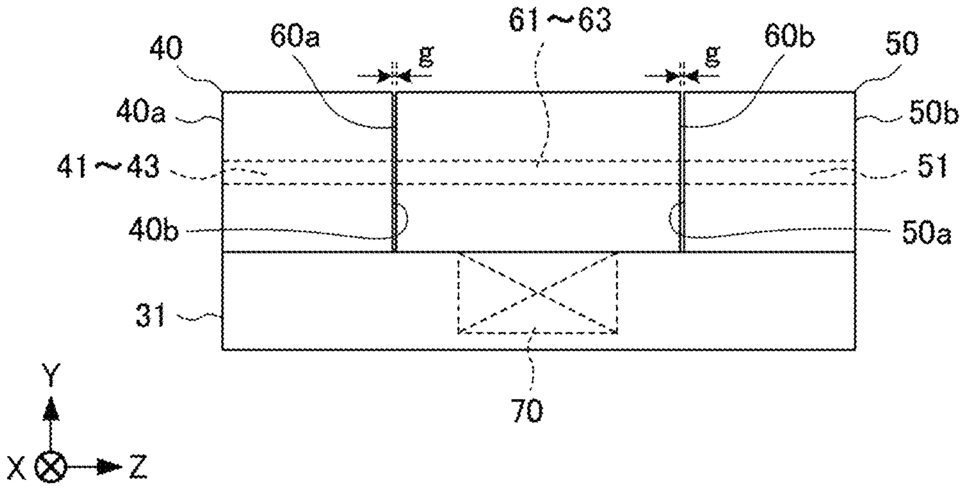
FIG. 9 is a side view of a waveguide switch having the waveguide connection structure according to the embodiment of the present invention.
Figure 10:
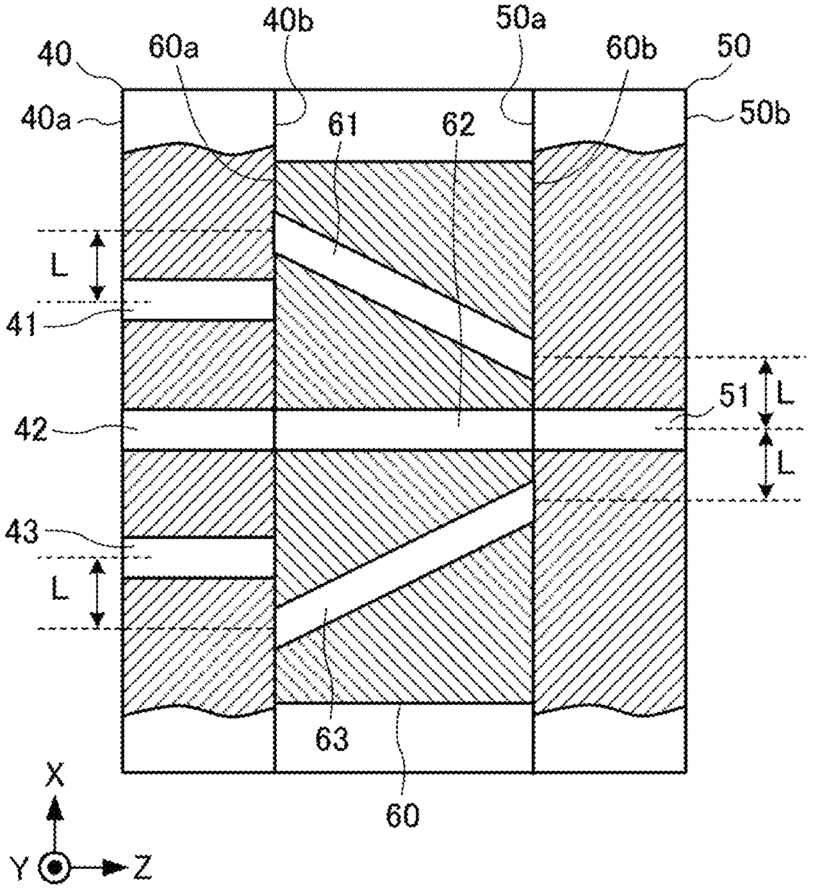
FIG. 10 is a plan view of a waveguide switch having the waveguide connection structure according to the embodiment of the present invention.

FIG. 8 is an exploded perspective view, FIG. 9 is a side view, and FIG. 10 is a plan view of the waveguide switch 100 including the waveguide connection structure 1 according to the embodiment of the invention. In addition, in these figures, orthogonal axes of X, Y, and Z are shown such that the direction of each part can be easily understood.

As shown in FIGS. 8 to 10, the waveguide switch 100 includes a base portion 31, a first fixed waveguide block 40, a second fixed waveguide block 50, a movable waveguide block 60, and a driving device 70. The first fixed waveguide block 40, the second fixed waveguide block 50, and the movable waveguide block 60 correspond to the waveguide 10 or the waveguide 20 having the WR-3 band shown in FIG. 1 or the like as a transmission band.

The base portion 31 is formed in a plate shape having a rectangular outer shape, the first fixed waveguide block 40 is fixed to one end side of the upper surface 31*a* of the base portion 31, and the second fixed waveguide block 50 is fixed to the other end side.

The first fixed waveguide block 40 is formed in a rectangular parallelepiped shape, and at least one (three in this example) waveguide paths 41, 42, and 43 having a predetermined diameter surrounded by metal walls are formed so as to penetrate from the first end face 40*a* to the second end face 40*b* on the opposite side. Here, the waveguide paths 41 to 43 are formed at the same height from the upper surface 31*a* of the base portion 31, in a direction perpendicular to the first end face 40*a* and the second end face 40*b*, in parallel with each other with a predetermined gap.

The diameters and heights of these waveguide paths 41 to 43 are the same as the waveguide path 51 of the second fixed waveguide block 50, which will be described later. The waveguide path 42 is formed on a line passing through the center of the waveguide path 51. The other two waveguide paths 41 and 43 are disposed such that the extension line passing through the center position of their openings sandwiches the extension line passing through the center position of the opening of the waveguide path 51 symmetrically.

On the other hand, the second fixed waveguide block 50 is formed in a rectangular parallelepiped shape having the same outer shape as the first fixed waveguide block 40, is fixed to the base portion 31 in a state of facing the third end face 50*a* in parallel with a predetermined distance therebetween, in the second end face 40*b* of the first fixed waveguide block 40, and at least one (one in this example) waveguide path 51 surrounded by a metal wall is formed so as to penetrate from the third end face 50*a* to the fourth end face 50*b* on the opposite side. The diameter and height of this waveguide path 51 are the same as those of the waveguide paths 41 to 43 of the first fixed waveguide block 40. Further, the waveguide path 51 is formed on a line passing through the center of the waveguide path 42 in a direction perpendicular to the third end face 50*a* and the fourth end face 50*b*.

The movable waveguide block 60 is supported so as to be slidable parallel to the second end face 40*b* and the third end face 50*a*, between the second end face 40*b* of the first fixed waveguide block 40 and the third end face 50*a* of the second fixed waveguide block 50, on the upper surface 31*a* of the base portion 31. The movable waveguide block 60 is formed in a rectangular parallelepiped shape having a length slightly shorter (for example, 200 μm) than the distance between the second end face 40*b* of the first fixed waveguide block 40 and the third end face 50*a* of the second fixed waveguide block 50 and approximately the same height as the first and second fixed waveguide blocks 40 and 50, and approximately the same height as the first and second fixed waveguide blocks 40 and 50, and a plurality of (in this example, three corresponding to the number of waveguide paths 41 to 43 formed in the first fixed waveguide block 40) waveguide paths 61, 62, and 63 surrounded by metal walls are formed to penetrate from the fifth end face 60*a* to the sixth end face 60*b*. Here, the fifth end face 60*a* faces the second end face 40*b* of the first fixed waveguide block 40 in parallel with a gap g (for example, g=100 μm), and the sixth end face 60*b* faces the third end face 50*a* of the second fixed waveguide block 50 in parallel with the gap g (for example, g=100 μm).

The diameters and heights of the waveguide paths 61 to 63 of the movable waveguide block 60 are the same as those of the waveguide paths 41 to 43 of the first fixed waveguide block 40 and the waveguide path 51 of the second fixed waveguide block 50. The waveguide path 62 is formed in a direction perpendicular to the fifth end face 60*a* and the sixth end face 60*b*. The other two waveguide paths 61 and 63 are formed obliquely with respect to the fifth end face 60*a* and the sixth end face 60*b*. These plurality of waveguide paths 61 to 63 surrounded by metal walls are provided with different passband characteristics within the millimeter wave band, by a known method such as arranging a resonance plate or a dielectric resonator inside.

In the position shown in FIG. 10 (hereinafter referred to as the "neutral position"), the opening of the central waveguide path 62 on the fifth end face 60*a* side is aligned concentrically with the opening of the waveguide path 42 of the first fixed waveguide block 40 on the second end face 40*b* side, and the opening of the central waveguide path 62 on the sixth end face 60*b* side is aligned concentrically with the opening of the waveguide path 51 of the second fixed waveguide block 50 on the third end face 50*a* side. Therefore, in the neutral position of FIG. 10, the waveguide path 42 of the first fixed waveguide block 40 and the waveguide path 51 of the second fixed waveguide block 50 are connected via the waveguide path 62 of the movable waveguide block 60.

In the neutral position, the opening positions of the waveguide paths 61 to 63 on the side of the fifth end face 60*a* are spaced outward by L from the opening position of the waveguide path 42 of the first fixed waveguide block 40, and the opening positions of the waveguide paths 61 to 63 on the side of the sixth end face 60*b* are spaced apart by L on both sides from the opening position of the waveguide path 51 of the second fixed waveguide block 50.

Figure 11:
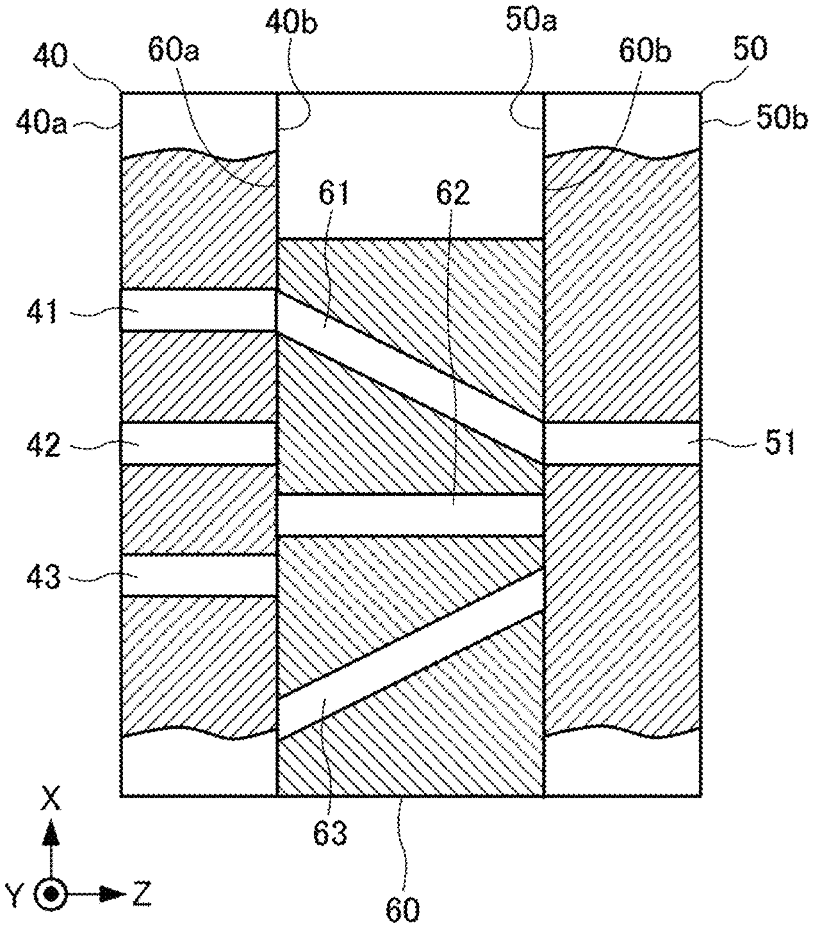
FIG. 11 is an operation explanatory diagram (part 1) of the waveguide switch according to the embodiment of the present invention.

Therefore, as shown in FIG. 11, at the first position where the movable waveguide block 60 is slid in the width direction (X direction) by −L from the neutral position, the opening position of the waveguide path 41 on the second end face 40*b* side of the first fixed waveguide block 40 and the opening position of one waveguide path 61 on the fifth end face 60*a* side of the movable waveguide block 60 match, the opening position of the waveguide path 51 on the third end face 50*a* side of the second fixed waveguide block 50 and the opening position of the waveguide path 61 on the sixth end face 60*b* side of the movable waveguide block 60 match, and the waveguide path 41 of the first fixed waveguide block 40 and the waveguide path 51 of the second fixed waveguide block 50 are connected via the waveguide path 61.

Figure 12:
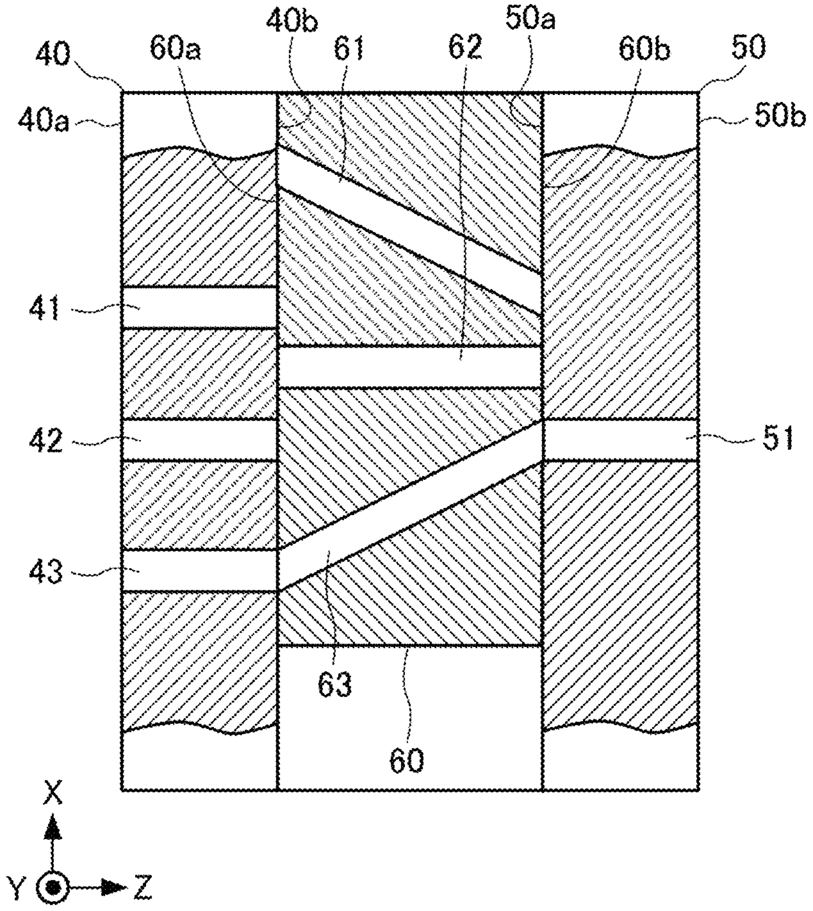
FIG. 12 is an operation explanatory diagram (part 2) of the waveguide switch according to the embodiment of the present invention.
Figure 13:
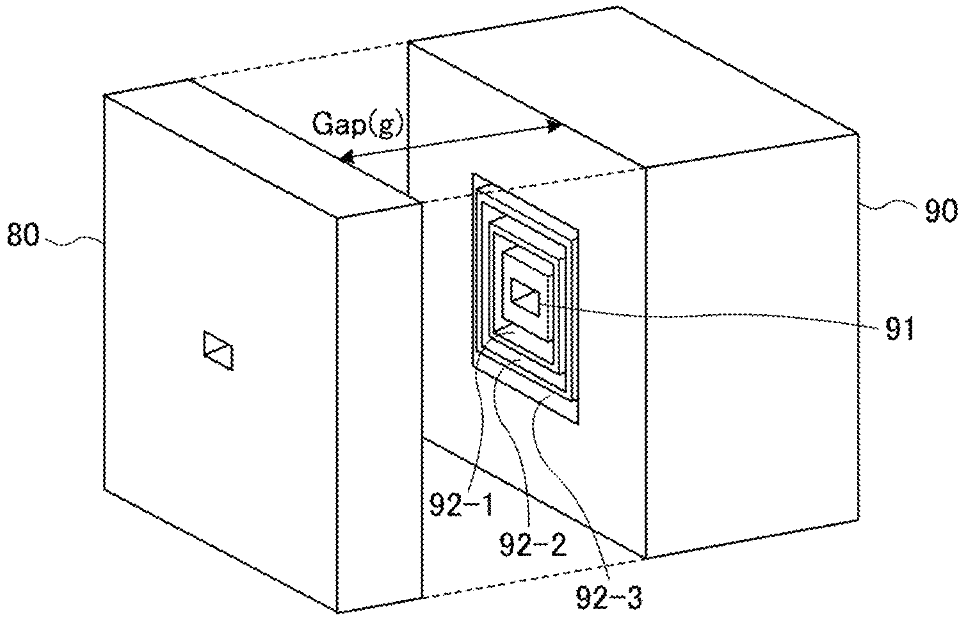
FIG. 13 is a perspective view showing a waveguide connection structure in the related art.
Figure 14:
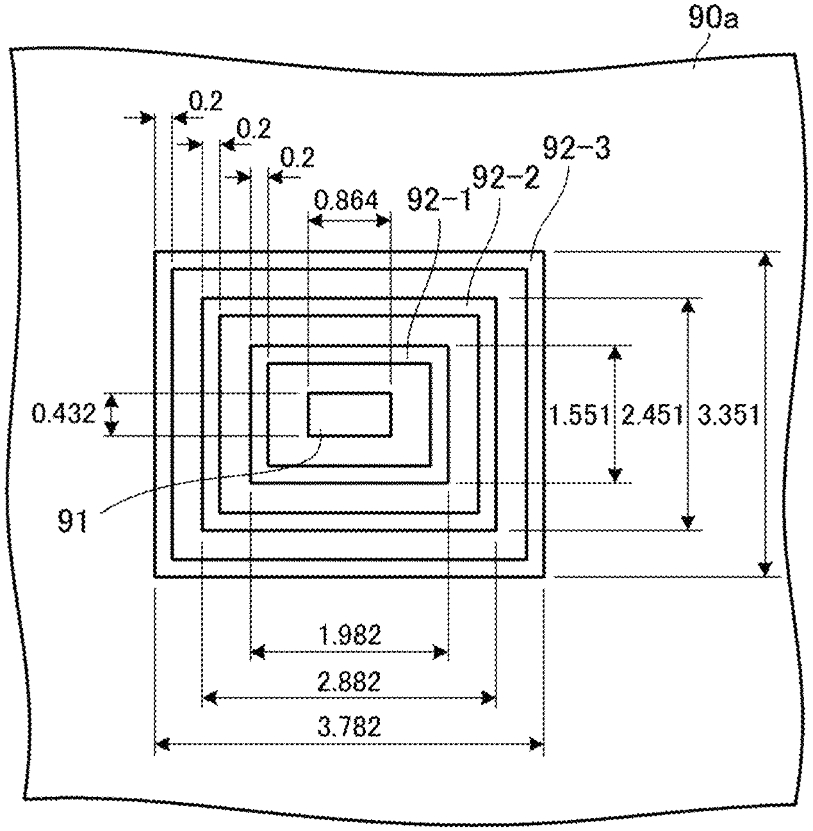
FIG. 14 is an enlarged front view showing a choke structure in the waveguide connection structure in the related art.

Further, as shown in FIG. 12, at the second position where the movable waveguide block 60 is slid in the width direction by L from the neutral position, the opening position of the waveguide path 43 on the second end face 40*b* side of the first fixed waveguide block 40 and the opening position of the waveguide path 63 on the fifth end face 60*a* side of the movable waveguide block 60 match, the opening position of the waveguide path 51 on the third end face 50*a* side of the second fixed waveguide block 50 and the opening position of the waveguide path 63 on the sixth end face 60*b* side of the movable waveguide block 60 match, and the waveguide path 43 of the first fixed waveguide block 40 and the waveguide path 51 of the second fixed waveguide block 50 are connected via the waveguide path 63.

In this manner, the movable waveguide block 60 slides with respect to the first fixed waveguide block 40 and the second fixed waveguide block 50, and any of the waveguide paths 61 to 63 is selectively connected to between any of the waveguide paths 41 to 43 of the first fixed waveguide block 40 and the waveguide path 51 of the second fixed waveguide block 50, in different positions (neutral position, first position, and second position).

This example has a symmetrical structure in which the waveguide path 51 of the second fixed waveguide block 50 is located on the extension line of the line passing through the center of the waveguide path 42 of the first fixed waveguide block 40, and at the neutral position, the three waveguide paths 61 to 63 of the movable waveguide block 60 are also line-symmetrical with respect to the extension line. On the other hand, an asymmetrical structure in which the waveguide path 51 of the second fixed waveguide block 50 is not on the extension line of the line passing through the center of the waveguide path 42 of the first fixed waveguide block 40 is also possible, and in this case, the three waveguide paths 61 to 63 of the movable waveguide block 60 are also disposed asymmetrically.

The movable waveguide block 60 is slidably supported by the driving device 70 provided on the base portion 31. Although the structure of the driving device 70 is arbitrary, for example, a structure that converts the rotary motion of the stepping motor into linear motion and transmits the motion to the support member that supports the movable waveguide block 60 from the lower surface side of the base portion 31. In this case, the position and movement distance of the movable waveguide block 60 are detected by a sensor, an encoder, or the like, and the movable waveguide block 60 may be controlled to be able to selectively move to at least the neutral position in FIG. 10, the first position in FIG. 11, and the second position in FIG. 12.

The choke groove 25 as shown in any of FIGS. 3A to 3C is provided in a band-shaped region R surrounding at least one opening among the openings of the waveguide paths 41 to 43 on the second end face 40*b* side of the first fixed waveguide block 40, the opening of the waveguide path 51 on the third end face 50*a* side of the second fixed waveguide block 50, and the openings of the plurality of waveguide paths 61 to 63 on the fifth end face 60*a* side and the sixth end face 60*b* side of the movable waveguide block 60.

As described above, the waveguide connection structure 1 according to the present embodiment has a structure in which a choke groove 25 having a shape that covers a region having a strong electric field of the electromagnetic wave leaking into the predetermined gap g between the waveguide 10 and the waveguide 20 is formed in one or both of the end face 10*b* and the end face 20*a*. With this configuration, the waveguide connection structure 1 according to the present embodiment can effectively suppress leakage of electromagnetic waves from the connection point of the two waveguides 10 and 20 facing each other.

Further, the waveguide connection structure 1 according to the present embodiment may be a structure in which the four groove portions 25*a* to 25*d* forming the choke groove 25 are separated from each other by four non-groove portions 27*a* to 27*d* along the diagonal direction of the opening of the rectangle of the waveguide path 11 or the waveguide path 21, in the band-shaped region R. With this configuration, the waveguide connection structure 1 according to the present embodiment can suppress the return loss $S_{11}$ to less than-15 dB, over the entire operating frequency range of a WR-3 waveguide (fractional bandwidth of about 40%), for example, with respect to a predetermined gap g up to about 1/10 wavelength of the guide wavelength.

Further, in the determination method of the waveguide connection structure 1 according to the present embodiment, the shape of the equiphase surface of the electromagnetic waves of the leakage prevention target frequency propagating from one to the other of the two analysis waveguides is acquired by electromagnetic field analysis, so that it is possible to determine the range of the band-shaped region R on either one or both of the end face 10*b* and the end face 20*a* of the two waveguides 10 and 20.

Further, in the manufacturing method of the waveguide connection structure 1 according to the present embodiment, the choke groove 25 is formed in the band-shaped region R of either one or both of the end face 10*b* and the end face 20*a* determined by the above determination method, and the two waveguides 10, 20 are disposed such that the end faces 10*b* and 20*a* face each other in parallel with a predetermined gap g therebetween. With this configuration, the manufacturing method of the waveguide connection structure 1 according to the present embodiment can manufacture the waveguide connection structure 1 capable of effectively suppressing the leakage of electromagnetic waves from a connection point of two facing waveguides 10 and 20.

Further, the waveguide switch 100 according to the present embodiment uses the above-described waveguide connection structure 1 for the moving unit (movable waveguide block 60), thereby improving the return loss and insertion loss of the switch over a wide band, and can suppress the unintended leakage of electromagnetic waves in the gap between the first fixed waveguide block 40 and the movable waveguide block 60 and the gap between the second fixed waveguide block 50 and the movable waveguide block 60.

Further, the waveguide switch 100 according to the present invention uses the above-described waveguide connection structure 1 for the moving unit (the movable waveguide block 60), so that the gap between the first fixed waveguide block 40 and the movable waveguide block 60 and the gap between the second fixed waveguide block 50 and the movable waveguide block 60 can be made wider than before, and the machining accuracy is relaxed and the resistance to aging is improved.

DESCRIPTION OF REFERENCE NUMERALS AND SIGNS

1 Waveguide connection structure
10, 20 Waveguide
10*b*, 20*a* End face
11, 21 Waveguide path
25 Choke groove
25*a*, 25*b*, 25*c*, 25*d* Groove portion
26*a*, 26*b*, 27*a*, 27*b*, 27*c*, 27*d* Non-groove portion
31 Base portion
31*a* Upper surface
40 First fixed waveguide block

40*a* First end face
40*b* Second end face
41, 42, 43 Waveguide path
50 Second fixed waveguide block
50*a* Third end face
50*b* Fourth end face
51 Waveguide path
60 Movable waveguide block
60*a* Fifth end face
60*b* Sixth end face
61, 62, 63 Waveguide path
70 Driving device
100 Waveguide switch
R Band-shaped region
λg Guide wavelength

What is claimed is:

1. A waveguide connection structure comprising:
two waveguides having end faces each of which is formed with at least one waveguide path, the end faces facing each other in parallel with a predetermined gap, wherein
a choke groove having a depth corresponding to ¼ of a guide wavelength corresponding to a leakage prevention target frequency is provided at the end face of at least one of the two waveguides, in a band-shaped region surrounding an opening of a rectangle of the at least one waveguide path,
the band-shaped region is a region whose center is a center of the rectangle, and which is bounded by an inner ellipse and an outer ellipse whose major axis direction is parallel to a longer side of the rectangle,
a minor radius of the inner ellipse corresponds to ¼ of the guide wavelength,
a minor radius of the outer ellipse is longer than the minor radius of the inner ellipse by a length corresponding to ¼ of the guide wavelength, and
the choke groove includes two groove portions that are in contact with the inner ellipse and the outer ellipse and are located on the longer side of the rectangle, in the band-shaped region.

2. The waveguide connection structure according to claim 1, wherein
the choke groove further includes two groove portions that are in contact with the inner ellipse and the outer ellipse and are located on a shorter side of the rectangle, in the band-shaped region, and
the four groove portions are separated from each another by four non-groove portions along a diagonal direction of the rectangle in the band-shaped region.

3. A determination method of a waveguide connection structure in which end faces of two waveguides respectively formed with at least one waveguide path face each other in parallel with a predetermined gap, a choke groove having a depth corresponding to ¼ of a guide wavelength corresponding to a leakage prevention target frequency is provided at the end face of at least one of the two waveguides, in a band-shaped region surrounding an opening of a rectangle of the at least one waveguide path, the band-shaped region is a region whose center is a center of the rectangle, and which is bounded by an inner ellipse and an outer ellipse whose major axis direction is parallel to a longer side of the rectangle, a minor r radius of the inner ellipse corresponds to ¼ of the guide wavelength, a minor radius of the outer ellipse is longer than the minor radius of the inner ellipse by a length corresponding to ¼ of the guide wavelength, and the choke groove includes two groove portions that are in contact with the inner ellipse and the outer ellipse and are located on the longer side of the rectangle, in the band-shaped region, the determination method comprising:
an electromagnetic field analysis step of, by using, as an analysis model, an analysis waveguide connection structure in which end faces of two analysis waveguides, which respectively have waveguide paths of the same shape as the waveguide paths and are not formed with choke grooves, face each other in parallel with a predetermined gap, when an electromagnetic wave of the leakage prevention target frequency propagates from one to the other of the two analysis waveguides which are not formed with the choke grooves, acquiring a shape of an equiphase surface of electromagnetic waves leaking from the predetermined gap by electromagnetic field analysis;
an ellipse shape acquisition step of acquiring a minor radius and a major radius of an equiphase surface separated by a distance corresponding to ¼ of the guide wavelength in a direction perpendicular to the longer side of the rectangle from the center of the rectangle, among the equiphase surfaces acquired in the electromagnetic field analysis step;
an inner ellipse shape determination step of determining the minor radius and the major radius of the equiphase surface acquired in the ellipse shape acquisition step as the minor radius and a major radius of the inner ellipse; and
an outer ellipse shape determination step of determining values obtained by respectively adding a distance corresponding to ¼ of the guide wavelength to the minor radius and the major radius of the inner ellipse determined in the inner ellipse shape determination step as the minor radius and a major radius of the outer ellipse.

4. A manufacturing method of a waveguide connection structure in which end faces of two waveguides respectively formed with at least one waveguide path face each other in parallel with a predetermined gap, a choke groove having a depth corresponding to ¼ of a guide wavelength corresponding to a leakage prevention target frequency is provided at the end face of at least one of the two waveguides, in a band-shaped region surrounding an opening of a rectangle of the at least one waveguide path, the band-shaped region is a region whose center is a center of the rectangle, and which is bounded by an inner ellipse and an outer ellipse whose major axis direction is parallel to a longer side of the rectangle, a minor radius of the inner ellipse corresponds to ¼ of the guide wavelength, a minor radius of the outer ellipse is longer than the minor radius of the inner ellipse by a length corresponding to ¼ of the guide wavelength, and the choke groove includes two groove portions that are in contact with the inner ellipse and the outer ellipse and are located on the longer side of the rectangle, in the band-shaped region, the manufacturing method comprising:
an electromagnetic field analysis step of, by using, as an analysis model, an analysis waveguide connection structure in which end faces of two analysis waveguides, which respectively have waveguide paths of the same shape as the waveguide paths and are not formed with choke grooves, face each other in parallel with a predetermined gap, when an electromagnetic wave of the leakage prevention target frequency propagates from one to the other of the two analysis waveguides which are not formed with the choke grooves, acquiring a shape of an equiphase surface of electromagnetic waves leaking from the predetermined gap by electromagnetic field analysis;

an ellipse shape acquisition step of acquiring a minor radius and a major radius of an equiphase surface separated by a distance corresponding to ¼ of the guide wavelength in a direction perpendicular to the longer side of the rectangle from the center of the rectangle, among the equiphase surfaces acquired in the electromagnetic field analysis step;

an inner ellipse shape determination step of determining the minor radius and the major radius of the equiphase surface acquired in the ellipse shape acquisition step as the minor radius and a major radius of the inner ellipse;

an outer ellipse shape determination step of determining values obtained by respectively adding a distance corresponding to ¼ of the guide wavelength to the minor radius and the major radius of the inner ellipse determined in the inner ellipse shape determination step as the minor radius and a major radius of the outer ellipse;

a choke groove formation step of forming the choke groove in the band-shaped region defined by the minor radii and the major radii of the inner ellipse and the outer ellipse determined in the inner ellipse shape determination step and the outer ellipse shape determination step; and a waveguide arrangement step of arranging the two waveguides such that the end faces of the two waveguides face each other in parallel with the predetermined gap.

5. A waveguide switch comprising:

a base portion;

a first fixed waveguide block that is fixed to the base portion, and in which at least one waveguide path surrounded by a metal wall is formed penetrating from a first end face to a second end face;

a second fixed waveguide block that is fixed to the base portion and has a third end face parallel to the second end face of the first fixed waveguide block, and in which at least one waveguide path surrounded by a metal wall is formed penetrating from the third end face to a fourth end face;

a movable waveguide block which has a fifth end face facing the second end face of the first fixed waveguide block with a predetermined gap in parallel and a sixth end face facing the third end face of the second fixed waveguide block with a predetermined gap in parallel, in which a plurality of waveguide paths surrounded by metal walls are formed penetrating from the fifth end face to the sixth end face, and which is supported by the base portion so as to be slidable parallel to the second end face of the first fixed waveguide block and the third end face of the second fixed waveguide block; and a driving device that is provided on the base portion and slides the movable waveguide block, wherein the movable waveguide block is slid with respect to the first fixed waveguide block and the second fixed waveguide block, and any one of the plurality of waveguide paths of the movable waveguide block is selectively connected to between any one of the at least one waveguide path of the first fixed waveguide block and any one of the at least one waveguide path of the second fixed waveguide block, in different plurality of positions, a choke groove having a depth corresponding to ¼ of a guide wavelength corresponding to a leakage prevention target frequency is provided, in a band-shaped region surrounding at least one of an opening of the at least one waveguide path on a second end face side of the first fixed waveguide block, an opening of the at least one waveguide path on a third end face side of the second fixed waveguide block, and openings of the plurality of waveguide paths on a fifth end face side and a sixth end face side of the movable waveguide block, the band-shaped region is a region whose center is a center of a rectangle, and which is bounded by an inner ellipse and an outer ellipse whose major axis direction is parallel to a longer side of the rectangle, a minor radius of the inner ellipse corresponds to ¼ of the guide wavelength, a minor radius of the outer ellipse is longer than the minor radius of the inner ellipse by a length corresponding to ¼ of the guide wavelength, and the choke groove includes two groove portions that are in contact with the inner ellipse and the outer ellipse and are located on the longer side of the rectangle, in the band-shaped region.

* * * * *